US008254387B2

(12) United States Patent
Anderson et al.

(10) Patent No.: US 8,254,387 B2
(45) Date of Patent: Aug. 28, 2012

(54) METHOD AND APPARATUS FOR ESTABLISHING AND MAINTAINING A SPECTRALLY EFFICIENT MULTICAST GROUP CALL

(75) Inventors: Jeff S. Anderson, Itasca, IL (US); Henry W. Anderson, Palatine, IL (US); Bradley M. Hiben, Glen Ellyn, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 287 days.

(21) Appl. No.: 12/826,974

(22) Filed: Jun. 30, 2010

(65) Prior Publication Data

US 2012/0002581 A1    Jan. 5, 2012

(51) Int. Cl.
    *H04L 12/28* (2006.01)
(52) U.S. Cl. .................. 370/390; 370/338; 370/432
(58) Field of Classification Search ............ 455/226.3
     See application file for complete search history.

(56) References Cited

U.S. PATENT DOCUMENTS

| | | | |
|---|---|---|---|
| 5,530,918 | A | 6/1996 | Jasinski |
| 6,052,064 | A | 4/2000 | Budnik et al. |
| 7,050,773 | B2 * | 5/2006 | Bi .......................... 455/226.1 |
| 2008/0274759 | A1 * | 11/2008 | Chen et al. .................. 455/507 |
| 2008/0316952 | A1 | 12/2008 | Gruber et al. |
| 2009/0252076 | A1 | 10/2009 | Song |

FOREIGN PATENT DOCUMENTS

| | | |
|---|---|---|
| EP | 1280370 A2 | 1/2003 |
| GB | 2434719 A | 8/2007 |
| WO | 2005/104595 A1 | 11/2005 |

OTHER PUBLICATIONS

PCT International Search Report Dated Mar. 1, 2011.
Universal Mobile Telecommunications System (UMTS); LTE: Requirements for Evolved UTRA 9E-UTRA) and Evolved UTRAN (E-UTRAN) (3GPP TR 25.913 Version 9.0.0 Release 9); Technical Report, European Telecommunications Standards Institute (ETSI) 650, Route Des Lucioles; Sophia-Antipolis, France; No. V9.0.0, Feb. 1, 2010; XP014044970.
Jal-Hoon Kim, et al. "On-Demanded Multicast Zone Configuration in CDMA Network Systems" Wireless Personal Communications, Kluwer Academic Publishers, DO, vol. 53, No. 2, Mar. 8, 2009; pp. 235-251, XP019796332, ISSN:1572-834X.

* cited by examiner

*Primary Examiner* — Duc C Ho
(74) *Attorney, Agent, or Firm* — Randi L. Karpinia

(57) ABSTRACT

A method, device, and system for establishing and maintaining a multicast group call. The method includes monitoring one or more link parameters for each of a plurality of communication devices associated with the multicast group call. The method further includes selecting, for each of the plurality of communication devices, a sector from a plurality of permitted sectors, the selected sector providing an associated highest signal strength for the communication device and forming a multicast communication zone based on the selected sectors. The method further proceeds with calculating a signal to interference plus noise ratio (SINR) for each communication device based on the formed multicast communication zone, identifying a communication device with a lowest SINR, updating a spectral efficiency metric relative to the formed multicast communication zone based on the lowest SINR, and establishing the multicast group call when the updated spectral efficiency metric meets a minimum expected spectral efficiency metric.

16 Claims, 3 Drawing Sheets

METHOD AND APPARATUS FOR ESTABLISHING AND MAINTAINING A SPECTRALLY EFFICIENT MULTICAST GROUP CALL

RELATED APPLICATIONS

The present application is related to the following U.S. application commonly owned with this application by Motorola, Inc.: Ser. No. 12/826,928 filed Jun. 30, 2010, titled "METHOD AND APPARATUS FOR ESTABLISHING A GROUP CALL", the entire contents of which being incorporated herein by reference.

FIELD OF THE DISCLOSURE

The present disclosure relates generally to group calls in communication systems and more particularly to the method and apparatus for establishing and maintaining a spectrally efficient multicast group call in a communication system.

BACKGROUND

Various real time situations require a group call setup in a communication system to enable different users in different geographical locations having varying signal conditions to communicate at the same time. In certain situations, a group of users associated with the group call can be present within a particular geographic area or cellular sector and can be serviced using multicast or broadcast communication mode.

The present standards release 9 Long Term Evolution (LTE) system as described in http://www.3gpp.org/Release-9 provides broadcast services by selectively transmitting to cells within a preconfigured zone. However, the standards do not provide a method for selecting the actual transmitters for a multicast or broadcast communication. Also, the standards do not specify how to include or remove users to or from the multicast or broadcast communication based on a current spectral efficiency, RF signal conditions and mobility associated with the users.

Accordingly, there is a need for a method and apparatus for establishing and maintaining a spectrally efficient multicast group call.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
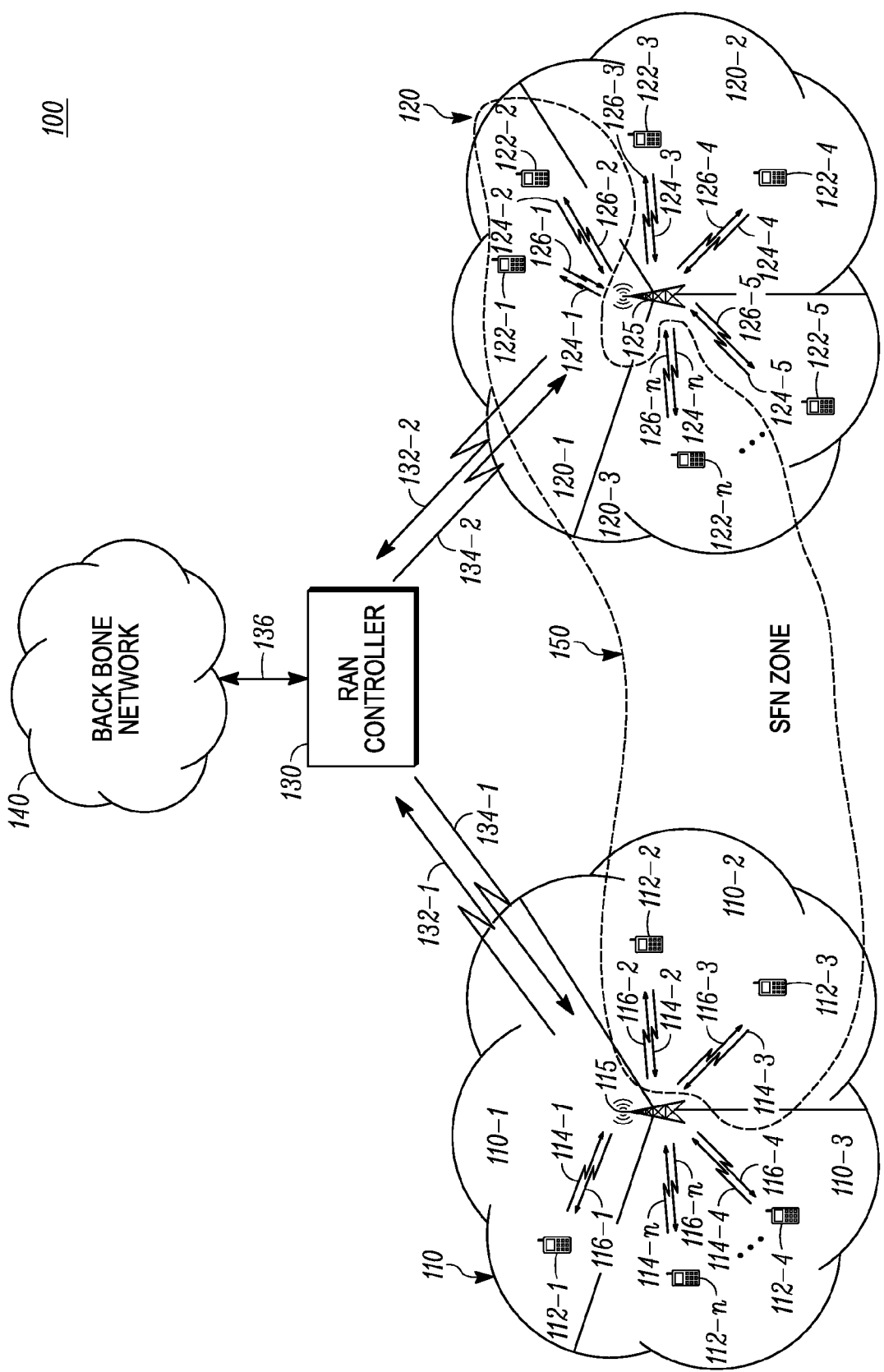
FIG. 1 is a block diagram of a communication system operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method, device, and system for establishing and maintaining a multicast group call among a plurality of communication devices is described herein. The system includes a plurality of communication sectors serving the plurality of communication devices associated with the multicast group call and a control entity communicating with the plurality of communication sectors. In accordance with some embodiments, the control entity monitors one or more link parameters for each of the plurality of communication devices associated with the multicast group call. The control entity selects, for each of the plurality of communication devices, a communication sector from the plurality of communication sectors based on the monitored link parameters. The selected communication sector provides an associated highest signal strength for the communication device. A plurality of selected communication sectors are grouped to form a multicast communication zone for the multicast group call. The control entity then calculates a signal to interference plus noise ratio (SINR) for each communication device associated with the multicast group call based on the formed multicast communication zone and identifies a communication device with a lowest SINR among the plurality of communication devices. The control entity further calculates a spectral efficiency metric relative to the formed multicast communication zone based on the lowest SINR and establishes and maintains the multicast group call among the plurality of communication devices in the formed multicast communication zone when the updated spectral efficiency metric meets a minimum expected spectral efficiency metric for the multicast group call.

Referring now to the figures, FIG. 1 is a block diagram of a communication system 100 for establishing and maintaining a multicast group call. In accordance with some embodiments, the communication system 100 is a Long Term Evolution/Evolved Universal Terrestrial Radio Access (LTE/EUTRA) system. However, the teachings herein are not limited to LTE/EUTRA systems but can be applied to other types of systems using the same or different multiplexing technologies. Such systems may include, for example, Institute of Electrical and Electronics Engineers (IEEE) 802.16/Worldwide Interoperability for Microwave Access (WiMax), Universal Mobile Telecommunications System (UMTS), Code Division Multiple Access (CDMA) 2000, IEEE 802.11, and the like.

Referring back to FIG. 1, the communication system 100 includes a radio access network (RAN) controller 130 communicatively coupled to a back bone network 140 such as, but not limited to an internet. The RAN controller 130 can include a database containing a list of identities such as phone number, Internet Protocol (IP) address, RAN address, and the like, associated with communication devices that are participating in a multicast group call. The RAN controller 130 also includes information such as number of communication sectors available for serving the communication devices, number of sectors within the available sectors that are permitted to participate in the multicast group call, a signal strength provided by each communication sector to the communication devices, a SNR associated with each communication device, a spectral efficiency metric associated with the multicast group call, etc. The communication system 100 further includes multiple enhanced NodeBs (eNodeBs) 115 and 125 serving, respectively, a plurality of coverage areas 110 and 120, also referred to as sites or cellular sites.

As referred to herein, eNodeBs 115 and 125 are infrastructure devices that can communicate information in a wireless signal with the RAN controller 130 using respective uplink or reverse 132-1 and 132-2 logical channels and downlink or forward 134-1 and 134-2 logical channels. The eNodeBs 115 and 125 can receive information from one or more UEs 112-1 . . . 112-$n$ and 122-1 . . . 122-$n$ via logical uplink channels 114-1 . . . 114-$n$ and 124-1 . . . 124-$n$, respectively. Further, the eNodeBs 115 and 125 can transmit information to one or more UEs 112-1, 112-2 . . . 112-$n$ and 122-1, 122-2 . . . 122-$n$ via logical downlink channels 116-1 . . . 116-$n$ and 126-1 . . . 126-$n$, respectively. An eNodeB includes, but is not limited to, equipment commonly referred to as base transceiver stations, access points, routers or any other type of UE interfacing device in a wireless environment.

Returning to FIG. 1, each coverage area 110 and 120 is divided into a plurality of communication sectors or serving sectors 110-1, 110-2, 110-3 and 120-1, 120-2, 120-3, respectively. Each communication sector 110-1, 110-2, 110-3, 120-1, 120-2, and 120-3 serves a plurality of communication devices 112-1, 112-2 and 112-3, 112-4 . . . 112-$n$, 122-1 and 122-2, 122-3 and 122-4, and 122-5 . . . 122-$n$, respectively. The communication devices 112-1 . . . 112-$n$ and 122-1 . . . 122-$n$ are also referred to as user equipments (UEs) or subscriber stations. As referred to herein, an UE 112-1 . . . 112-$n$, 122-1 . . . 122-$n$ includes, but is not limited to, devices commonly referred to wireless communication devices such as mobile radios, mobile stations, subscriber units, access terminals, mobile devices, or any other device capable of operating in a wireless environment. Examples of UE include, but are not limited to, two-way radios, mobile phones, cellular phones, Personal Digital Assistants (PDAs), laptops and pagers.

In FIG. 1, the RAN controller 130, the eNodeBs 115 and 125, and the UEs 112-1, 112-2 . . . 112-$n$ and 122-1, 122-2 . . . 122-$n$ are equipped with transceivers, memories, and processing devices operatively coupled to carry out their functionality, including any functionality needed to implement the teachings herein and are further equipped with any other elements needed in a commercial embodiment.

Referring to FIG. 1, communication sectors 110-1, 110-2, 110-3, 120-1, 120-2, and 120-3, in general, the communication sector or serving sector 110-1, 110-2, 110-3, 120-1, 120-2, and 120-3 is a geographic region having an antenna concentrating the flow of power within the geographic region. In other words, each communication sector includes a directional antenna illuminating or radiating maximum energy in one particular direction, so that each communication sector can be considered as a new cell serving a plurality of communication devices. In one embodiment, when the coverage area 110, 120 is very small such as, for example a micro cell, a pico cell, or a femto cell, an omni directional antenna can be used for radiating energy in the sectors.

Referring to FIG. 1, the communication system 100 illustrates coverage areas 110 and 120 having a typical trisector structure. The trisector structure includes three communication sectors, for example 110-1, 110-2, 110-3 and 120-1, 120-2, 120-3, each sector having separate antennas (not shown). In other words, the eNodeB 115, 125 includes a plurality of antennas (not shown) oriented in various directions. This helps each communication sector 110-1, 110-2, 110-3 and 120-1, 120-2, and 120-3 to have a separate direction of tracking with respect to the adjacent communication sectors. In the present situation, with the trisector structure, each communication sector 110-1, 110-2, and 110-3, 120-1, 120-2, and 120-3 has a direction of tracking of one hundred and twenty degrees 120° with respect to the adjacent sectors.

In the FIG. 1 only a single RAN controller, two cellular sites, and a trisector structure are shown for ease of illustration. However, the teachings herein can be implemented within a system comprising additional RAN controller, more or fewer sites, and more number of sectors within a cellular site.

Returning to FIG. 1, in accordance with some embodiments, the RAN controller 130 periodically monitors one or more link parameters from each of the plurality of UEs 112-1 . . . 112-$n$ and 122-1 . . . 122-$n$ associated with the multicast group call, through the respective eNodeBs 115 or 125. The RAN controller 130 selects, for each UE (one of 112-1 . . . 112-$n$ and 122-1 . . . 122-$n$), a communication sector (one of 110-1, 110-2, 110-3, 120-1, 120-2, and 120-3) providing an associated highest signal strength for the UE (one of 112-1 . . . 112-$n$ and 122-1 . . . 122-$n$). Based on the selected communication sectors, the RAN controller 130 forms a multicast communication zone or a single frequency network (SFN) zone 150 for the multicast group call. The RAN controller 130 then calculates a SINR for each UE 112-1 . . . 112-$n$ and 122-1 . . . 122-$n$ associated with the multicast group call based on the formed SFN zone 150. The RAN controller 130 further identifies a UE with a lowest SINR among the plurality of UEs 112-1 . . . 112-$n$ and 122-1 . . . 122-$n$ and calculates a spectral efficiency metric relative to the formed SFN zone 150 based on the lowest SINR. When the calculated spectral efficiency metric meets a minimum expected spectral efficiency metric for the multicast group call, the RAN controller 130 instructs the eNodeBs 115 and 125 to use the selected sectors 110-1, 110-2, 110-3, 120-1, 120-2, and 120-3 to establish and maintain the multicast group call among the plurality of UEs, for example 112-2, 112-3, 122-1, 122-2, and 122-$n$, in the formed SFN zone 150.

Only a limited number of eNodeBs 115 and 125, sectors 110-1, 110-2, 110-3, 120-1, 120-2, and 120-3, and UEs 112-1 . . . 112-$n$, 122-1 . . . 122-$n$ are shown for ease of illustration. However, the communication system 100 can include any number of eNodeBs with any number of sectoring to support any number of UEs based on system requirements. Moreover, embodiments are not dependent on the protocol(s) used to facilitate communications in the system and can be used with any such protocols.

In general, the communication links (also referred to herein as communication channels or channels) comprise the physical communication resources over which information is sent between different elements in the communication system 100 and can include wired links (e.g., 136) or wireless links (e.g., 132-1, 132-2, 134-1, 134-2, 114-1 . . . 114-$n$, 116-1 . . . 116-$n$, 124-1 . . . 124-$n$, and 126-1 . . . 126-$n$) with a wireless interface between the equipment in the communication system 100 being defined by the protocols implemented in the communication system 100. For example, as illustrated in FIG. 1, the eNodeB 115,125 forwards information such as call request, link parameters associated with the UEs 112-1 . . . 112-$n$, 122-1 . . . 122-$n$, etc, to the RAN controller 130 via an uplink 132-1, 132-2. The eNodeB 115, 125 receives control information such as establishing a multicast group call among some of the UEs 112-1 . . . 112-$n$, 122-1 . . . 122-$n$, the communication sectors involved in the multicast group call, removing a particular UE from the multicast group call, involving or adding a new communication sector to the multicast group call, etc, from the RAN controller 130 via a downlink 134-1, 134-2. Further, the eNodeB 115,125 receives link parameters from one or more UEs 112-1, 112-2 . . . 112-n, 122-1, 122-2 . . . 122-n via respective logical uplink channels 114-1 . . . 114-n, 124-1 . . . 124-n. The eNodeB 115, 125 can unicast, broadcast, or multicast information to one or more UEs 112-1, 112-2 . . . 112-n, 122-1, 122-2 . . . 122-n via respective logical downlink channels 116-1 . . . 116-n, 126-1 . . . 126-n.

In a LTE/EUTRA system, each logical channel pair link (uplink and downlink pair), e.g., 114-116 and 124-126 constitutes a frequency division duplexed (FDD) or a time division duplexed (TDD) physical layer channels (frequency channels). The downlink or forward channel includes physical layer channels transmitted from the LTE/EUTRA to the user equipments, wherein the forward channel is also capable of supporting broadcast and multicast of control information and media information such as but not limited to audio media, video media, data media, and multimedia. The uplink or reverse channel includes the physical layer channels transmitted from the user equipments to the LTE/EUTRA.

The embodiments are described in the context of an LTE/EUTRA system for ease of illustration. However, the embodiments are not limited to such a system but can be applied within any other system that employs multiple carrier frequencies for multiple services.

Figure 2:
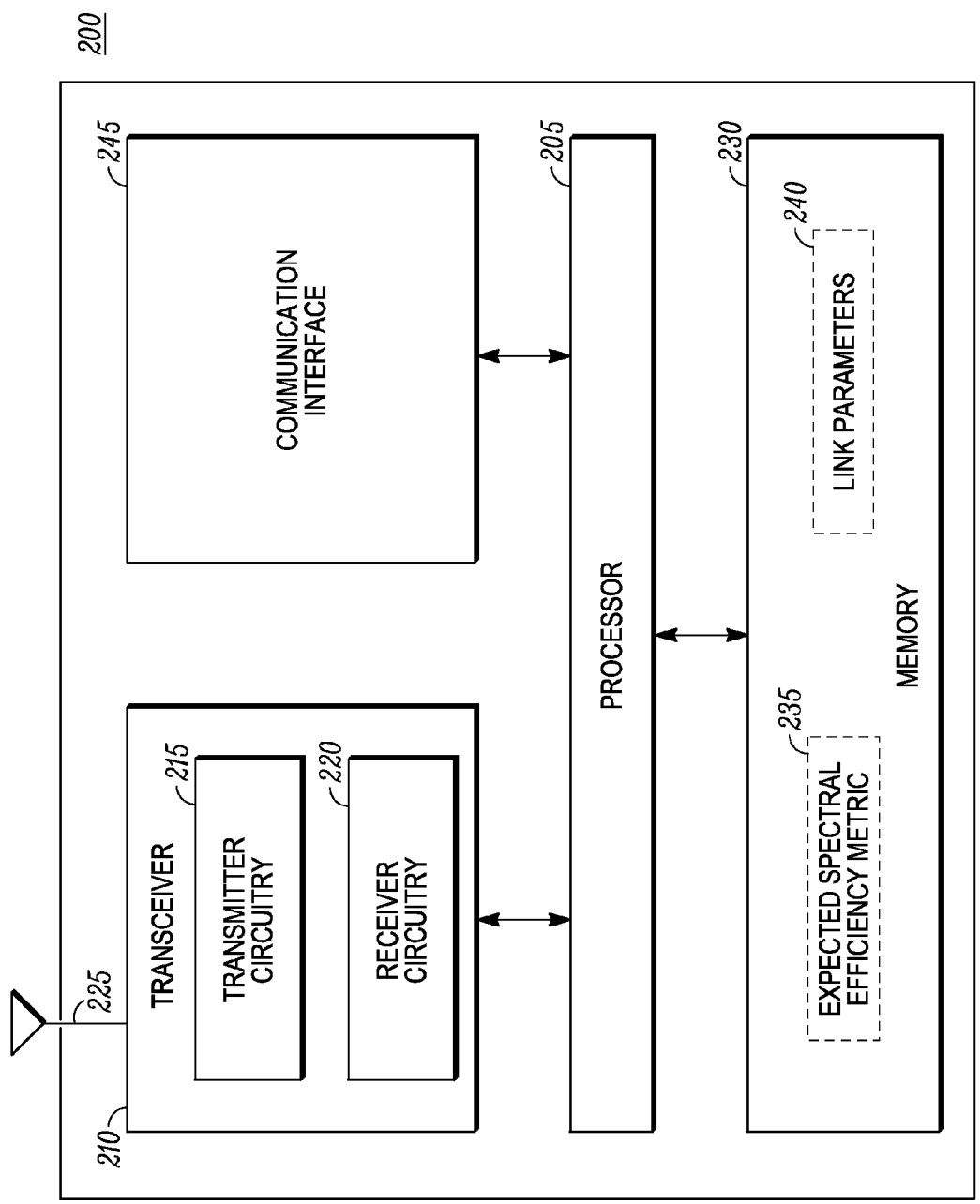
FIG. 2 is a block diagram illustrating an embodiment of a communication device employed in the communication system of FIG. 1 and operating in accordance with some embodiments.

FIG. 2 is a block diagram of a communication device 200 illustrating the internal components according to one embodiment. The communication device 200 can be one of eNodeBs 115 and 125 or RAN controller 130 in the communication system 100. The communication device 200 includes a processor 205, a transceiver 210 including a transmitter circuitry 215 and a receiver circuitry 220, an antenna 225, a memory 230 for storing operating instructions that are executed by the processor 205, and a communication interface 245. Although not shown, the communication device 200 also can include an antenna switch, duplexer, circulator, or other highly isolative means (not shown) for intermittently providing radio signals from the transmitter circuitry 215 to the antenna 225 and from the antenna 225 to the receiver circuitry 220. The communication device 200 is an integrated unit containing at least all the elements depicted in FIG. 2, as well as any other elements necessary for the communication device 200 to perform its particular electronic function. Alternatively, communication device 200 can comprise a collection of appropriately interconnected units or devices, wherein such units or devices perform functions that are equivalent to the functions performed by the elements of the communication device 200.

The processor 205 includes one or more microprocessors, microcontrollers, DSPs (digital signal processors), state machines, logic circuitry, or any other device or devices that process information based on operational or programming instructions. Such operational or programming instructions are stored in the memory 230. The memory 230 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card, external subscriber identity module (SIM) card or any other medium for storing non-transitory digital information. One of ordinary skill in the art will recognize that when the processor 205 has one or more of its functions performed by a state machine or logic circuitry, the memory 230 containing the corresponding operational instructions can be embedded within the state machine or logic circuitry.

The operations performed by the processor 205 and the other elements of the communication device 200 are described in detail below.

The transmitter circuitry 215 and the receiver circuitry 220 enable the communication device 200 to communicate radio signals to and acquire signals from the sectors 110-1, 110-2, 110-3 and 120-1, 120-2, 120-3 corresponding to the respective eNodeBs 115 and 125. In one embodiment, transmitter circuitry 215 and the receiver circuitry 220 enable the communication device 200 to communicate radio signals to and acquire signals from the UEs 112-1 . . . 112-n and 122-1 . . . 122-n and the RAN controller 130. In this regard, the transmitter circuitry 215 and the receiver circuitry 220 include appropriate, conventional circuitry to enable digital or analog transmissions over a wireless communication channel. The implementations of the transmitter circuitry 215 and the receiver circuitry 220 depend on the implementation of the communication device 200. For example, the transmitter circuitry 215 and the receiver circuitry 220 can be implemented as an appropriate wireless modem, or as conventional transmitting and receiving components of two-way wireless communication devices. In the event that the transmitter circuitry 215 and the receiver circuitry 220 are implemented as a wireless modem, the modem can be internal to the communication device 200 or insertable into the communication device 200 (e.g., embodied in a wireless radio frequency (RF) modem implemented on a Personal Computer Memory Card International Association (PCMCIA) card or a universal serial bus (USB) card). For a wireless communication device, the transmitter circuitry 215 and the receiver circuitry 220 are implemented as part of the wireless device hardware and software architecture in accordance with known techniques. One of ordinary skill in the art will recognize that most, if not all, of the functions of the transmitter circuitry 215 and/or the receiver circuitry 220 can be implemented in a processor, such as the processor 205. However, the processor 205, the transmitter circuitry 215, and the receiver circuitry 220 have been artificially partitioned herein to facilitate a better understanding.

The receiver circuitry 220 is capable of receiving radio frequency (RF) signals from at least one frequency band and optionally multiple frequency bands, when, for example, the communications with a proximate device are in a frequency band other than that of the system communications. The transceiver 210 includes one set of transmitter circuitry 215. The antenna 225 comprises any known or developed structure for radiating and receiving electromagnetic energy in the frequency range containing the wireless carrier frequencies. The communication interface 245 uses transceiver 210 to enable the communication device 200 to communicate with other devices and/or systems. For example, the communication interface 245 may include mechanisms for communicating with another device or system via a back bone network 140 as shown in FIG. 1.

As illustrated in FIG. 2, the memory 230 stores a minimum expected spectral efficiency value or metric 235 for the multicast group call and link parameters 240 associated with a plurality of communication devices associated with the multicast group call. The link parameters 240 include a received signal strength indication (RSSI) value, and a signal to interference ratio plus noise ratio (SINR) associated with the plurality of communication devices with respect to each sector 110-1, 110-2, 110-3, 120-1, 120-2, and 120-3. In one embodiment, for the LTE/EUTRA system 100, as shown in FIG. 1, the link parameters 240 include a reference signal received power (RSRP) and a reference signal received quality (RSRQ) associated with the UEs 112-1 . . . 112-n and

122-1 ... 122-n with respect to each sector 110-1, 110-2, 110-3, 120-1, 120-2, and 120-3. The link parameters 240 can also include a geographical location and a modulation and coding scheme (MCS) associated with each of the plurality of communication devices. The memory 230 can also store a list of available sectors and a list of sectors permitted to participate in the multicast group call. The communication device 200 uses the link parameters 240 to calculate a SINR for each communication device associated with the multicast group call within the formed SFN zone 150. The link parameters 240 are periodically received from all the devices associated with the multicast group call. The communication device 200 can receive the link parameters 240 from the UEs either through the communication interface 245 or through the transceiver circuitry 210 and the uplink channels 132, 114, and 124.

Figure 3:
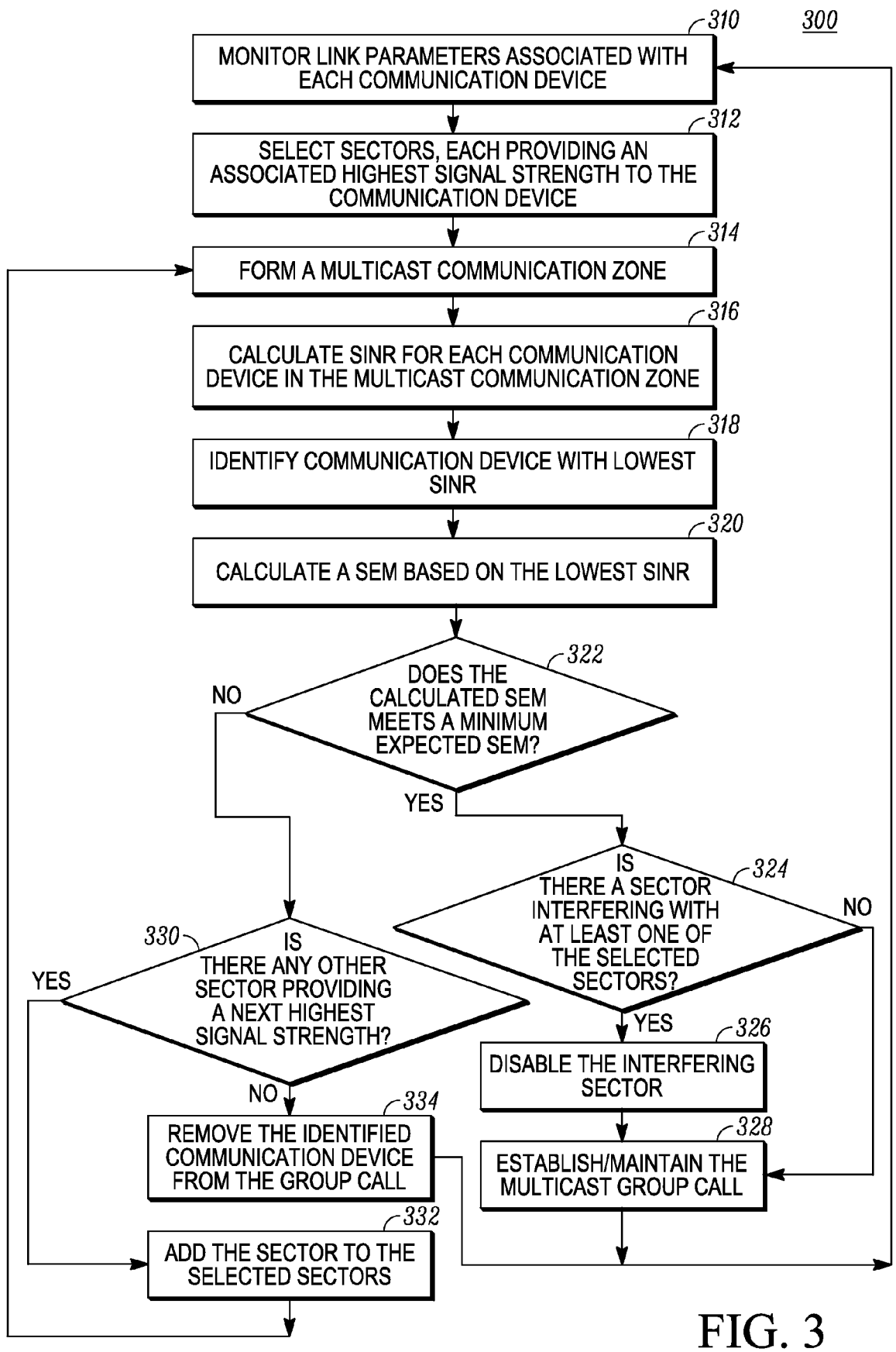
FIG. 3 is a flow diagram illustrating a method for establishing and maintaining a multicast group call among a plurality of communication devices in a communication system in accordance with some embodiments.

FIG. 3 is a flow diagram of a method 300 performed by a control entity, e.g. the RAN controller 130, for establishing and maintaining a multicast group call among a plurality of communication devices in a communication system in accordance with some embodiments. In one embodiment, the method 300 is performed by eNodeBs 115 and 125. The method 300 includes periodically monitoring 310 link parameters associated with each communication device associated with the multicast group call. The method 300 further includes selecting 312 a communication sector, from a plurality of permitted sectors, each sector providing an associated highest signal strength for each communication device and forming 314 a multicast communication zone or a single frequency network (SFN) zone based on the selected communication sectors. In one example, as shown in FIG. 1, the UEs 112-2, 112-3, 122-1, 122-2, 122-5, and 122-n are associated with the multicast group call and are served by the communication sectors 110-1 ... 110-3 and 120-1 ... 120-3. The communication sectors 110-2, 120-1, and 120-3 are found to provide highest signal strength to the UEs 112-2 and 112-3, 122-1 and 122-2, and 122-5 and 122-n, respectively. The communication sectors 110-2, 120-1, and 120-3 are therefore selected to form a multicast communication zone or the SFN zone 150.

Returning back to FIG. 3, method 300, upon forming 314 the multicast communication zone, the RAN controller 130 calculates 316 a SINR for each communication device present in the multicast communication zone. The calculated SINR includes a downlink signal to interference plus noise ratio (SINR) associated with the communication devices in the multicast communication zone. The downlink SINR is determined by enabling the selected communication sectors and disabling the other communication sectors excluding the selected sectors in the plurality of permitted sectors. In the present example, the calculated SINR includes a downlink SINR associated with each UE 112-2 and 112-3, 122-1 and 122-2, and 122-5 and 122-n present in the formed SFN zone 150. The downlink SINR is determined by enabling the selected communication sectors 110-2, 120-1, and 120-3 and disabling the other communication sectors (e.g. 110-2, 110-3, and 120-2) in the plurality of available sectors.

The method 300 proceeds with identifying 318 a communication device with the lowest SINR, for example UE 122-5, from the plurality of communication devices and calculating 320 a spectral efficiency metric (SEM) based on the lowest SINR. The SEM is defined as a product of data rate in bits/Hertz (Hz) associated with the multicast communication zone (SE) and a ratio of total number of communication devices to the total number sectors (M). SEM is defined by the following equation $$SEM = SE * M$$

where SE=SFN flow in bits/Hz, and M=Total number of UEs/Total number of communication sectors.

The SFN flow in bits/Hz is determined based on the lowest downlink SINR associated with the identified communication device. Determining the SFN flow from the downlink SINR is already known in the art. In one example, SE=0.5 bits/Hz and the total number of UEs=20 and the total number of sectors=20, in this case SEM=0.5*(20/20)=0.5. In another example, SE=0.2 bits/Hz and the total number of UEs=20 and the total number of sectors=1, in this case SEM=0.2*(20/1)= 0.4. In one another example, SE=0.1 bits/Hz and the total number of UEs=20 and the total number of sectors=5, in this case SEM=0.1*(20/5)=0.4.

Referring back to the method 300, after calculating 320 the SEM based on the lowest SINR, the method 300 compares 322 the calculated SEM with a predefined SEM or a minimum expected SEM for the multicast group call. When the calculated SEM meets the minimum expected SEM, a determination is made whether there is any sector (e.g. 110-1, 110-3, and 120-2) interfering 324 with the selected sectors 110-2, 120-1 and 120-3 to degrade the SEM to an unacceptable level. If there is no sector interfering with the selected sectors a multicast group call is established 328 among the communication devices in the multicast communication zone. If the multicast group call is already established then the call is maintained 328 among the communication devices in the multicast communication zone. In the present example, a multicast group call is established among the UEs 112-2,112-3, 122-1, 122-2, and 122-n present in the formed SFN zone 150, as shown in FIG. 1. On the other hand, if there is a sector, for example 120-2, inferring with the selected sectors and degrading the SEM, the interfering sector is disabled 326 or switched off and the multicast group call is established 328. Sectors, excluding the selected sectors, that do not interfere with the selected sectors can be used to support other broadcast, multicast, or unicast services.

Referring back to comparing 322, when the calculated SEM does not meet the minimum expected SEM, a determination is made whether there is any sector, other than the selected sectors, providing 330 a next highest signal strength to the identified communication device. If there is a sector providing a next highest signal strength, the sector is added 332 to the selected sectors to form 314 a new multicast communication zone. The method 300 continues with the steps of calculating 316 a SINR, identifying 318 a communication device, calculating SEM 320, and comparing 322, for the newly formed multicast communication zone. When the new SEM, otherwise called as updated SEM, meets the minimum expected SEM, the multicast group call is established/maintained (if already established) 328 among the plurality of communication devices in the newly formed multicast communication zone including the at least one sector. On the other hand, when the updated SEM does not meet the minimum expected SEM, the method 300 proceeds with the determination of whether there is any other sector providing 330 a next highest signal strength to the identified communication device. If no other sector in the plurality of permitted sectors excluding the selected sectors provides a next highest signal strength to the communication device with the lowest SINR and the updated SEM does not meet the minimum expected SEM then the communication device is removed 334 from the established or maintained multicast group call.

In the present example, for the identified UE 122-5, a check is made whether there is any other communication sector, for example 120-1, 120-3, providing next highest signal strength.

If the communication sector 120-3 provides the next highest signal strength the communication sector 120-3 is added to the selected sectors to form the new multicast zone and the SEM is updated. On the other hand, if there is no communication sector, for example none of 120-1 and 120-3, providing next highest signal strength to the UE 122-5 and the SEM does not meet the minimum expected SEM, then the UE 122-5 is removed from the SFN zone 150 and thereby removed from the established/maintained multicast group call.

In one embodiment, when two or more communication sectors are serving a particular UE or a group of UEs a simulcast transmission is enabled in the communication sectors. Simulcast transmission is defined as transmission of same data or information to the particular UE or the group of UEs from all the sectors serving the particular UE or the group of UE at the same frequency and at the same instant of time. In one embodiment, the same data or information is simultaneously broadcast or multicast from all the sectors serving the group of UEs. In another embodiment, the same data or information can be simultaneously unicast from the sectors to the particular UE.

The method 300 iterates by monitoring 310 periodically the link parameters from the UEs associated with the multicast group call and performing recursively the steps of selecting 312 through establishing/maintaining 328. The iteration stops with a group call termination signal from any one of the communication devices participating in the group call.

Advantages of the various embodiments include: dynamically selecting transmitters for a multicast group call based on radio frequency parameters and mobility associated with a plurality of communication devices to establish and maintain a spectrally efficient multicast group call. The dynamic selection helps in the optimal utilization of radio frequency resources such as communication channels and conservation of power at the infrastructure end and thereby achieving an improved spectral efficiency through out the multicast group call. Those skilled in the art will realize that the above recognized advantages and other advantages described herein are merely illustrative and are not meant to be a complete rendering of all of the advantages of the various embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for establishing and maintaining a multicast group call among a plurality of communication devices in a communication system, the method comprising:
at a control entity:
monitoring one or more link parameters for each of the plurality of communication devices associated with the multicast group call;
selecting, for each of the plurality of communication devices, a sector from a plurality of permitted sectors based on the monitored link parameters, the selected sector providing an associated highest signal strength for the communication device, wherein the selected sectors form a multicast communication zone for the multicast group call;
calculating a signal to interference plus noise ratio for each communication device associated with the multicast group call based on the formed multicast communication zone;
identifying a communication device with a lowest signal to interference plus noise ratio among the plurality of communication devices;
updating a spectral efficiency metric relative to the formed multicast communication zone based on the lowest signal to interference plus noise ratio; and
establishing and maintaining the multicast group call among the plurality of communication devices in the formed multicast communication zone when the updated spectral efficiency metric meets a minimum expected spectral efficiency metric for the multicast group call.

2. The method of claim 1 further comprising:
at the control entity:
removing the communication device with the lowest signal to interference plus noise ratio from the established or maintained multicast group call, when
the updated spectral efficiency metric does not meet the minimum expected spectral efficiency metric for the multicast group call and
the selected sectors forming the multicast communication zone include all of the sectors from the permitted sectors.

3. The method of claim 1 further comprising:
at the control entity:
adding at least one sector other than the selected sectors from the permitted sectors to the multicast communication zone, when
the updated spectral efficiency metric does not meet the minimum expected spectral efficiency metric for the multicast group call and
the at least one sector provides a next highest signal strength to the communication device with the lowest signal to interference plus noise ratio; and
establishing and maintaining the multicast group call among the plurality of communication devices in the formed multicast communication zone including the at least one sector.

4. The method of claim 1, wherein monitoring one or more link parameters further comprises:
receiving periodically, one or more link parameters from each of the plurality of communication devices associated with the multicast group call.

5. The method of claim 1, wherein updating the spectral efficiency metric relative to the formed multicast communication zone further comprises:
calculating the signal to interference plus noise ratio for each communication device associated with the multicast group call by enabling the selected sectors and disabling the other sectors excluding the selected sectors in the plurality of permitted sectors; and
calculating the spectral efficiency metric based on the lowest signal to interference plus noise ratio.

6. The method of claim 1, wherein establishing and maintaining the multicast group call further comprises:
determining whether at least one another sector, other than the selected sectors from the plurality of permitted sectors, interfere with at least one of the selected sectors; and
disabling the at least one another sector if the at least one another sector interferes with the at least one of the selected sectors.

7. The method of claim 1, wherein the link parameters include at least one of a reference signal received power (RSRP) and a reference signal received quality (RSRQ).

8. The method of claim 1, wherein the link parameters include at least one of a received signal strength indication (RSSI) value and a signal to interference plus noise ratio (SINR).

9. The method of claim 1, wherein the link parameters include a geographical location of the communication device.

10. The method of claim 1, wherein the spectral efficiency metric is determined based on at least one of a signal to interference plus noise ratio (SINR) and a modulation and coding scheme (MCS), associated with the plurality of communication devices associated with the group call.

11. A system for establishing and maintaining a multicast group call among a plurality of communication devices, the system comprising:
a plurality of communication sectors serving the plurality of communication devices associated with the multicast group call; and
a control entity communicating with the plurality of communication sectors, wherein the control entity
monitors one or more link parameters for each of the plurality of communication devices associated with the multicast group call;
selects, for each of the plurality of communication devices, a communication sector from the plurality of communication sectors based on the monitored link parameters, the selected communication sector providing an associated highest signal strength for the communication device, wherein the selected communication sectors form a multicast communication zone for the multicast group call;
calculates a signal to interference plus noise ratio for each communication device associated with the multicast group call based on the formed multicast communication zone;
identifies a communication device with a lowest signal to interference plus noise ratio among the plurality of communication devices;
updates a spectral efficiency metric relative to the formed multicast communication zone based on the lowest signal to interference plus noise ratio; and
establishes and maintains the multicast group call among the plurality of communication devices in the formed multicast communication zone when the updated spectral efficiency metric meets a minimum expected spectral efficiency metric for the multicast group call.

12. The system of claim 11, wherein the control entity:
removes the communication device with the lowest signal to interference plus noise ratio from the established or maintained multicast group call, when
the updated spectral efficiency metric does not meet the minimum expected spectral efficiency metric for the multicast group call and
the selected communication sectors forming the multicast communication zone include all of the communication sectors from the plurality of communication sectors.

13. The system of claim 11, wherein the control entity:
adds at least one communication sector other than the selected communication sectors from the plurality of communication sectors to the multicast communication zone, when
the updated spectral efficiency metric does not meet the minimum expected spectral efficiency metric for the multicast group call and
the at least one communication sector provides a next highest signal strength to the communication device with the lowest signal to interference plus noise ratio; and
establishes and maintains the multicast group call among the plurality of communication devices in the formed multicast communication zone including the at least one communication sector.

14. An apparatus comprising:
a communication interface for receiving periodically, one or more link parameters from each of a plurality of communication devices associated with a multicast group call; and
a processor coupled to the communication interface, wherein the processor is configured to:
monitor one or more link parameters for each of the plurality of communication devices associated with the multicast group call;
select, for each of the plurality of communication devices, a sector from a plurality of permitted sectors based on the monitored link parameters, the selected sector providing an associated highest signal strength for the communication device, wherein the selected sectors form a multicast communication zone for the multicast group call;
calculate a signal to interference plus noise ratio for each communication device associated with the multicast group call based on the formed multicast communication zone;
identify a communication device with a lowest signal to interference plus noise ratio among the plurality of communication devices;
update a spectral efficiency metric relative to the formed multicast communication zone based on the lowest signal to interference plus noise ratio; and
establish and maintain the multicast group call among the plurality of communication devices in the formed multicast communication zone when the updated spectral efficiency metric meets a minimum expected spectral efficiency metric for the multicast group call.

15. The apparatus of claim 14, wherein the processor is further configured to:
remove the communication device with the lowest signal to interference plus noise ratio from the established or maintained multicast group call, when
the updated spectral efficiency metric does not meet the minimum expected spectral efficiency metric for the multicast group call and
the selected sectors forming the multicast communication zone include all of the sectors from the permitted sectors.

16. The apparatus of claim 14, wherein the processor is further configured to:
add at least one sector other than the selected sectors from the permitted sectors to the multicast communication zone, when
the updated spectral efficiency metric does not meet the minimum expected spectral efficiency metric for the multicast group call and
the at least one sector provides a next highest signal strength to the communication device with the lowest signal to interference plus noise ratio; and
establish and maintain the multicast group call among the plurality of communication devices in the formed multicast communication zone including the at least one sector.

* * * * *

UNITED STATES PATENT AND TRADEMARK OFFICE
CERTIFICATE OF CORRECTION

PATENT NO. : 8,254,387 B2  
APPLICATION NO. : 12/826974  
DATED : August 28, 2012  
INVENTOR(S) : Anderson et al.

Page 1 of 1

It is certified that error appears in the above-identified patent and that said Letters Patent is hereby corrected as shown below:

In Column 3, Line 3, delete "SNR" and insert -- SINR --, therefor.

In Column 4, Lines 3-4, delete "dire sction" and insert -- direction --, therefor.

Signed and Sealed this
Twelfth Day of February, 2013

Teresa Stanek Rea
*Acting Director of the United States Patent and Trademark Office*